Figure 1A:
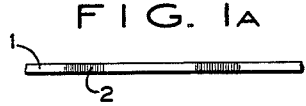

July 5, 1966   C. T. TAN ET AL   3,259,503
PUFFED FOOD PRODUCT AND A METHOD OF MAKING THE SAME
Filed July 16, 1963

INVENTORS
CHEE TECK TAN
ROBERT R. BALDWIN
BY
Morgan, Finnegan, Durham & Pine
ATTORNEYS

United States Patent Office 3,259,503
Patented July 5, 1966

3,259,503
PUFFED FOOD PRODUCT AND A METHOD
OF MAKING THE SAME
Chee Teck Tan, Toronto, Ontario, Canada, and Robert R.
Baldwin, Briarcliff Manor, N.Y., assignors to Continental Baking Company, Rye, N.Y., a corporation of New York
Filed July 16, 1963, Ser. No. 295,348
19 Claims. (Cl. 99—83)

This invention relates to new and improved food products and to methods of making such products. More particularly, the invention is directed to new and improved food snacks comprising a doughy substrate having heterogeneously incorporated therein discrete, whole pieces or particles of non-doughy foodstuffs.

The food market is literally flooded with food "snack" products. None of these well-known, puffed, chip-like, products, however, carry within their structure separate and discrete pieces of other, entirely different foods whose characteristics of form, shape, texture, taste, and so forth, are completely foreign to the carrying food product or substrate.

It is an object of this invention to provide a food product, or "snack," which comprises a substrate of dough having cohesively incorporated therein separate and discrete whole pieces or particles of a foodstuff which is completely foreign to the doughy substrate.

A further object of this invention is to produce a crisp, ready-to-eat, puffed food snack of the type hereinafter described.

Still another object of this invention is to produce an intermediate food product which can readily be cooked to produce the ready-to-eat puffed food snack of the type hereinafter described.

Other objects of the invention will, in part, be obvious and will, in part, appear in the ensuing description.

The substrate of the instant snack products, comprises a dough which is prepared essentially from starch and flour. Preferably, the dough ingredients will also include a protein.

Although starches derived from wheat, corn, sago, sorghum, rice, potato or tapioca may be used, potato starch is preferred.

Flours obtained from any cereal, grains or edible tuber may be used; such as those obtained from maize, wheat, potato, farina, tapioca, and so forth. However, that flour which is obtained from the potato is preferred because of its excellent water-binding properties, its desirable flavor and the adhesive and cohesive characteristics imparted to dough produced therefrom.

Typical of the proteins that may be used are devitalized dried gluten, isolated soy protein, soy flour, those derived from milk products, and so forth. Because of the physical and chemical properties which they impart to the dough, soy proteins are preferred.

The general and preferred ranges of the abovementioned dough ingredients are as follows:

| Ingredient | General range (parts by wgt.) | Preferred range (parts by wgt.) |
|---|---|---|
| Flour | 7–30 | 17–27 |
| Starch | 35–75 | 40–60 |
| Protein | 0–50 | 20–30 |

The foreign food adjuncts are incorporated into the dough in amounts of between 5–40 weight percent based upon the total dry weight of the dough ingredients. The food adjuncts which may be incorporated in the dough mix include nuts, fruits, vegetables, spices, vegetable seeds, meat, poultry, fish, milk products; such as cheeses, and so forth. Particularly good results are obtained when nuts are incorporated in the dough mix and they are preferred for use.

The solid food adjuncts may be incorporated into the dough ingredients in any desired manner. However, prior to incorporation, such food adjuncts should be treated so that they are introduced into the dough mix in a raw, blanched, or partially cooked state. Complete cooking of the food adjunct will be accomplished during final processing.

Preparation of the solid food adjunct may be illustrated when peanuts, one of the preferred embodiments of the invention, are selected for incorporation into the dough mix. Shelled peanuts are de-skinned either by roasting for 10–15 minutes at an oven temperature of about 375° F. or by soaking in tap water for about 30 minutes at a temperature of between 70–75° F. The peanuts may then be mechanically chopped until they are capable of passing through a screen of pre-determined mesh size. Thus reduced in size, whole or discrete particles of peanuts may be incorporated in the dough mix or may be admixed after the dough preparation.

In addition to the essential ingredients mentioned above, other materials may be used in the composition of the dough mixture, such as salt, shortenings, lubricants, artificial flavorings, sugars, milk products, water, etc. The extent to which these additional materials may be incorporated depends upon the individual texture, flavor, composition, consistency, etc., desired in the finished food snack.

It has also been discovered that small amounts of monosodium glutamate (MSG) present in the dough composition further enhances the flavor quality of the final food product. Where it is desired to use MSG, it may be incorporated in the dough mixture, in amounts of between about 0–2.0 weight percent and preferably between about 0.25–0.75 weight percent while 0.5 weight percent appears to be optimum.

The water content of the dough is important and should be adjusted to the point where the starch granules present are swollen but not ruptured to a major degree during heat processing.

With this limitation, the parts of water to be incorported into the total parts of dry dough mix will vary with the different processing methods employed. Generally the amount of water added to the dry ingredients to form the dough may vary from about 0.5–4 parts per part of dry dough mix. However, care should be exercised when adding water to the dry mix to form the dough since an excess of water will seriously inhibit and hamper the adhesive and cohesive characteristics of the dough while too little water will result in an incomplete dough mixture. Depending upon the type and amount of ingredients selected to obtain the dry mix, good results of adhesion and cohesion in the final dough can be obtained by controlling the amount of water added to the dry mix within the limits described above.

In a typically cooked dough mixture, the normal moisture content will be in a range of 45–50 weight percent, based on the dry weight of the total mixture. It has been discovered that with this amount of moisture present in the dough, the desired texture and physical characteristics of adhesion and cohesion in the finished snack product may be obtained by cooling the dough sufficiently to enable it to be sliced, cut or extruded. The moisture content of the dough is then adjusted by any conventional drying means to a level of 8–12% by weight of the weight of the total mixture. When so dried, the product will have a characteristic, horn-like outer layer.

Typical examples of dough formulae that have been prepared with regard to the instant food snack are as follows:

*Example 1*

| Ingredients: | Parts by weight |
| --- | --- |
| Potato starch | 45.0 |
| Potato flour | 22.0 |
| Salt | 2.5 |
| Monosodium glutamate | 0.5 |
| Water | 80.0 |

*Example 2*

| Ingredients: | Parts by weight |
| --- | --- |
| Potato starch | 60.0 |
| Potato flour | 27.0 |
| Salt | 2.5 |
| Monosodium glutamate | 0.5 |
| Water | 80.0 |

*Example 3*

| Ingredients: | Parts by weight |
| --- | --- |
| Potato starch | 52.0 |
| Potato flour | 20.0 |
| Soy protein | 20.0 |
| Hydrogenated lard | 3.0 |
| Salt | 2.0 |
| Glucose | 2.0 |
| Monosodium glutamate | 1.0 |
| Water | 170.0 |

To the above formulae may be added the dry food adjuncts described herein in an amount of between about 5–40 percent by weight of the dough mixture, and preferably between about 20–30 percent by weight.

Preparation of the dough mixtures described above may be accomplished by a variety of methods. For example, it may be prepared by first blending the dry ingredients, adding water and mixing until a homogeneous dough mixture results; or, automatically extruding the dough mixture under mechanical feeding of the ingredients and metering each ingredient as it is introduced into the mixture; or, it may be prepared by forming a slurry comprised of starch and water, cooking the slurry in a batch or continuous process, then mixing in the remaining ingredients until a homogeneous dough is formed.

Once the homogeneous dough mixture is formed, the intermediate product may be obtained through any one or more of the following methods which are listed for purposes of exemplification and are not intended to be limited thereby:

(1) Partially cook, cool, slice, and dry to 8–12% moisture content.
(2) Partially cook, extrude, cool, cut and dry to 8–12% moisture content.
(3) Pan, autoclave or pressure cook, cool, slice, and dry to 8–12% moisture content.
(4) Pan, autoclave or pressure cook, extrude, cool, cut, and dry to 8–12% moisture content.
(5) Roll or sheet, cut, and dry to 8–12% moisture content.

Partial cooking may be accomplished by subjecting the dough mixture to normal baking temperatures; usually between 375°–450° F., or by autoclaving.

Extrusion may be conducted through any extrusion-type mechanism which is equipped with heating chambers.

Autoclaving or pressure cooking is conducted at an average pressure of about 15 pounds for approximately 20 minutes.

In each and every instance, except where the dough is prepared by rolling or sheeting at ambient room temperatures, it is necessary to cool the dough prior to slicing, cutting or forming the dough into desired shapes and sizes. This may be accomplished by permitting the dough to stand at room temperatures or subjecting it to slight refrigeration at 35°–40° F. until the dough is firm.

Figure 1B:
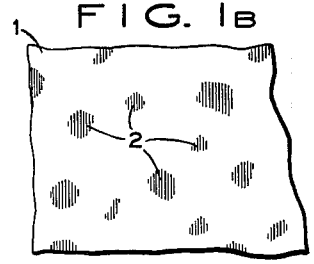
Figure 1C:
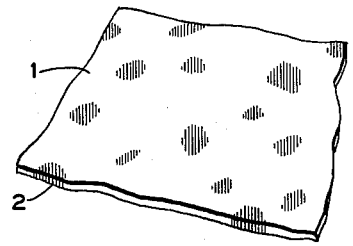
Figure 2A:
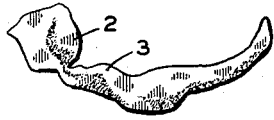
Figure 2C:
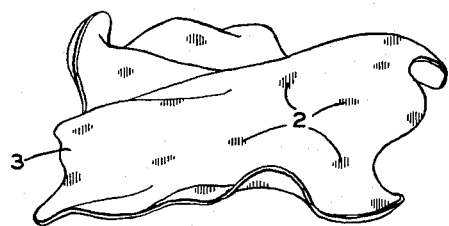
Figure 2B:
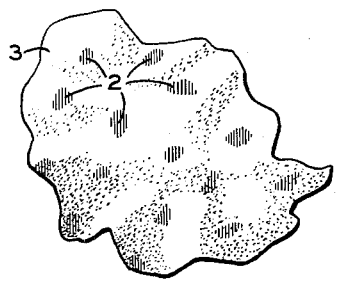

The nature of the invention will be made more clear by reference to the accompanying drawings wherein FIGURES 1A, 1B and 1C illustrate non-fried discs of dough which are mostly flat, translucent pieces with clearly defined edges and occasional irregular sides, and FIGURES 2A, 2B and 2C are illustrations of fried chips having an irregular shape with a tendency to curl and form humped surfaces and rounded edges.

In FIGURES 1A, 1B and 1C, the physical shape and form of the dough is in the intermediate stage and has incorporated therein discrete, whole pieces of peanuts. FIGURE 1A is a side view; FIGURE 1B a top view; and FIGURE 1C an isometric view of the intermediate product wherein each view 1 denotes the partially dried, dough substrate and 2 represent discrete, whole pieces of peanuts which are firmly and heterogeneously incorporated into the dough substrate.

The intermediate product is now ready for further processing into the finished food snack product or it may be packaged and stored in any one of the conventional methods to await further processing.

The final or finished food snack product is obtained by deep-fat frying the intermediate product in a hot, edible oil bath at about 350–425° F., or by subjecting it to any other conventional heating media until the product achieves "puffing" or has expanded to about 3–6 times its original size.

In FIGURES 2A, 2B and 2C of the attached drawing is illustrated a puffed peanut chip which was obtained by deep-fat frying of the intermediate food product as described above. FIGURE 2A is a side view; FIGURE 2B a top view; and FIGURE 2C an isometric view of the finished product wherein each view 2 indicates discrete, whole pieces of peanuts which are firmly and heterogeneously incorporated into 3, the cooked dough substrate.

The finished product is then ready for packaging by any one of the various, conventional methods well known in the art.

The amounts and types of ingredients used to obtain the finished food snack product hereinabove described are illustrated in the formulae set forth below.

A typical procedure to be followed in preparing the products described will be made clear from the following example:

*Example 4*

Dough ingredients and their parts by weight were mixed according to the following formula:

| Ingredients: | Parts by weight |
| --- | --- |
| Potato starch | 50.0 |
| Potato flour | 22.0 |
| Peanuts | 25.0 |
| Salt | 2.5 |
| Monosodium glutamate | 0.5 |
| Water | 80.0 |

Shelled peanuts were roasted in an oven at 370° F. for 10 minutes. After cooling, they were de-skinned then reduced in size until the whole pieces of peanuts passed through a No. 4 wire screen mesh. Monosodium glutamate and salt were then dissolved in water and the remaining ingredients of potato flour, potato starch, peanuts or peanut butter were dry mixed. Next, the solution of MSG and salt plus water were added to the dry mix and a dough was formed. The dough was placed in a cake tray and allowed to cool by standing overnight at room temperature until the moisture content of the dough was at about 10% by weight. The dried dough slices were then immersed in a hot edible oil bath which was at a temperature of 375° F. and allowed to remain therein for about 40 seconds, until "puffing" was complete. The puffed chips were then removed from the bath, cooled, lightly sprinkled with salt and packaged.

Various other modifications and changes may be made from the embodiment of the invention and/or the examples, illustrations and procedures described herein without departing from the spirit and scope of the invention as contained in the following claims.

We claim:

1. A process for producing a new and improved food snack product which comprises preparing a dough mixture comprising, by weight, about 35 to 75 percent starch and about 7 to 30 percent flour, incorporating therein about 5 to 40 percent, based upon the total dry weight of the dough ingredients, of distinctly discernible, edible pieces of a foreign food adjunct, adding between about 0.5 and 4 parts of water per part of dry dough mix, the amount of water being sufficient to cause swelling, but not extensive rupture of the starch granules, mixing the aforesaid ingredients after addition of said water to form a dough, firming the dough to render it capable of being mechanically sliced, mechanically slicing the dough into a plurality of pieces, drying the slices to a moisture content of about 8–12 weight percent, and immersing the resulting slices into a hot, edible oil bath at about 350–425° F. until they have expanded to about 3–6 times their original size to thereby form puffed snack pieces comprising a cooked dough substrate having incorporated therein discrete, edible pieces of a foreign food adjunct.

2. A process for producing a new and improved food snack product which comprises preparing a dough mixture comprising, by weight, about 35 to 75 percent starch and about 7 to 30 percent flour, incorporating therein about 5 to 40 percent, based upon the total weight of the dry dough ingredients, of distinctly discernible, edible pieces of a foreign food adjunct, adding between about 0.5 and 4 parts water per part of dry dough mix, the amount of water being sufficient to cause swelling, but not extensive rupture, of the starch granules, mixing the aforesaid ingredients after addition of said water to form a dough, partially cooking the dough mixture until the moisture content of the dough, is between about 45 and 50 percent by weight, cooling the partially cooked dough to firm it, mechanically slicing the firmed dough into pieces, drying the pieces to a moisture content of about 8–12 weight percent, and immersing the pieces into a hot, edible oil bath at about 350–425° F. until they have expanded to about 3–6 times their original size to thereby form puffed food snack pieces comprising a cooked dough substrate having intrinsically incorporated therein edible pieces of a foreign food adjunct.

3. The process of claim 1, wherein the dough includes as an ingredient separate from the flour, up to 50 percent by weight of a protein.

4. The process of claim 1 wherein the foreign food adjuncts are distinctly discernible, pieces selected from the group consisting of nuts, fruits, spices, vegetable seeds, vegetables, meat, poultry, fish and discrete pieces of products derived from milk.

5. The process of claim 2 wherein the foreign food adjunct is distinctly discernible edible pieces of peanuts.

6. The process of claim 2 wherein partial cooking is achieved by oven baking at about 375–450° F. for short periods of about one hour.

7. The process of claim 2 wherein partial cooking is achieved by pressure cooking at about 15 pounds of pressure for about 20 minutes.

8. The process of claim 2 wherein cooling is achieved by permitting the partially cooked dough to stand until it has reached ambient room temperature.

9. The process of claim 2 wherein cooling is achieved by subjecting the partially cooked dough to refrigeration.

10. A process for producing food snack slices capable of expansion, to 3–6 times their original size upon immersion in a hot, edible oil bath at about 350–425° F., which comprises preparing a dough mixture comprising about 35 to 75 percent starch and about 7 to 30 percent flour, incorporating therein 5 to 40 percent, based upon the total dry weight of the dough ingredients, of distinctly discernible edible pieces of a foreign food adjunct, adding 0.5 to 4 parts of water per part of dry dough mix, the amount of water being sufficient to cause swelling, but not extensive rupture, of the starch granules, mixing the aforesaid ingredients after addition of said water to form a dough, firming the dough to render it capable of being mechanically sliced, mechanically cutting the firmed dough mixture into slices, drying the slices to a moisture content of about 8–12 weight percent, and thereafter packaging and storing the dried slices until puffing by immersion in a hot, edible oil bath is desired.

11. A process for producing new and improved intermediate food snack slices capable of expansion to 3–6 times their original size upon immersion in a hot, edible oil bath at about 350–425° F., which comprises preparing a dough mixture comprising by weight, about 35 to 75 percent starch and about 7 to 30 percent flour, incorporating therein about 5 to 40 percent, based upon the total dry weight of the dough ingredients, of distinctly discernible edible pieces of a foreign food adjunct, adding 0.5 to 4 parts of water, the amount of water being sufficient to cause swelling, but not extensive rupture, of the starch granules, mixing the aforesaid ingredients after addition of said water to form a dough, partially cooking the dough mixture until the water content is between about 45 to 50 weight percent, cooling the partially cooked dough mixture to firm the dough, mechanically cutting the firmed dough into slices, drying the slices to a moisture content of about 8–12 weight percent, and thereafter packaging and storing the dried slices until puffing by immersion in a hot, edible oil bath is desired.

12. The process of claim 10 wherein the dough includes a protein.

13. The process of claim 10 wherein the foreign food adjuncts are distinctly discernible edible pieces selected from the group consisting of nuts, fruits, spices, vegeable seeds, vegetables, meat, poultry, fish and discrete pieces of products derived from milk.

14. The process of claim 11 wherein the foreign food adjunct is distinctly discernible edible pieces of peanuts.

15. The process of claim 11 wherein partial cooking is achieved by oven baking at about 375–425° F. for short periods of about one hour.

16. The process of claim 11 wherein partial cooking is achieved by pressure cooking at about 15 pounds of pressure for about 20 minutes.

17. The process of claim 11 wherein cooling is achieved by permitting the partially cooked dough to stand until it has reached ambient room temperature.

18. The process of claim 11 wherein cooling is achieved by subjecting the partially cooked dough to refrigeration.

19. The product produced by the process of claim 4.

(References on following page)

References Cited by the Examiner

UNITED STATES PATENTS

| | | | |
|---|---|---|---|
| 2,421,216 | 5/1947 | Penty | 99—83 |
| 2,693,419 | 11/1954 | Gager | 99—83 |
| 2,791,508 | 5/1957 | Rivoche | 99—83 X |
| 2,998,318 | 8/1961 | Forkner | 99—86 |
| 3,076,710 | 2/1963 | Koolhaas | 99—86 X |
| 3,105,766 | 10/1963 | Barton | 99—83 X |
| 3,174,864 | 3/1965 | Schiebel | 99—1 |

OTHER REFERENCES

Cruess et al.: "The Fruit Products Journal and American Vinegar Industry," June 1933 issue, vol. 12, No. 10, pages 302–3.

A. LOUIS MONACELL, *Primary Examiner.*

RAYMOND N. JONES, *Examiner.*